United States Patent
Kwon et al.

(10) Patent No.: US 9,492,866 B2
(45) Date of Patent: Nov. 15, 2016

(54) BELT-SHAPED METAL NANOSTRUCTURE AND METHOD FOR PREPARING SAME

(75) Inventors: Won-Jong Kwon, Daejeon (KR); Gyo-Hyun Hwang, Daejeon (KR); Sang-Uck Lee, Daejeon (KR); Hyuk Kim, Daejeon (KR); Jung-Won Park, Seoul (KR); Sung-Ho Yoon, Seoul (KR); Kyung-Hoon Lee, Wonju-si (KR)

(73) Assignee: LG Chem, Ltd., Seoul (KR)

( * ) Notice: Subject to any disclaimer, the term of this patent is extended or adjusted under 35 U.S.C. 154(b) by 533 days.

(21) Appl. No.: 13/582,683

(22) PCT Filed: Mar. 10, 2011

(86) PCT No.: PCT/KR2011/001677
§ 371 (c)(1),
(2), (4) Date: Sep. 10, 2012

(87) PCT Pub. No.: WO2011/112020
PCT Pub. Date: Sep. 15, 2011

(65) Prior Publication Data
US 2012/0329636 A1    Dec. 27, 2012

(30) Foreign Application Priority Data
Mar. 11, 2010    (KR) .................. 10-2010-0021856

(51) Int. Cl.
*B22F 1/02* (2006.01)
*B22F 1/00* (2006.01)
*B82Y 30/00* (2011.01)

(52) U.S. Cl.
CPC .............. *B22F 1/0018* (2013.01); *B82Y 30/00* (2013.01); *B22F 1/0025* (2013.01)

(58) Field of Classification Search
CPC ....................................................... B22F 1/0025
USPC .................................. 434/156, 157, 159, 160
See application file for complete search history.

(56) References Cited

U.S. PATENT DOCUMENTS

| 7,101,961 B2 | 9/2006 | Wang et al. | |
|---|---|---|---|
| 2005/0277757 A1* | 12/2005 | Wang et al. | 528/229 |

FOREIGN PATENT DOCUMENTS

| CN | 1674329 | 9/2005 |
|---|---|---|
| CN | 101107737 | 1/2008 |
| CN | 101454078 | 6/2009 |
| JP | 04-202707 | 7/1992 |
| JP | 2004-161570 A | 6/2004 |
| JP | 2004-182518 A | 7/2004 |
| JP | 2005-524000 | 8/2005 |

(Continued)

OTHER PUBLICATIONS

Zhou et al. ("Effects of conductive polyaniline (PANI) preparation and platinum electrodeposition on electroactivity of methanol oxidation," Journal of Applied Electrochemistry 34, pp. 455-459, Apr. 2004).*

(Continued)

*Primary Examiner* — Melvin C Mayes
*Assistant Examiner* — James Corno
(74) *Attorney, Agent, or Firm* — Dentons US LLP

(57) ABSTRACT

The present invention relates to a belt-shaped metal nanostructure in which a wide surface area of catalytically active material can be realized even by a relatively small amount thereof so that it shows an excellent catalytic activity, and a method for preparing same.

16 Claims, 8 Drawing Sheets

(56) References Cited

FOREIGN PATENT DOCUMENTS

| JP | 2007-528616 | 10/2007 |
|---|---|---|
| JP | 2007-535413 | 12/2007 |
| JP | 2008-156745 | 7/2008 |
| JP | 2009-37752 A | 2/2009 |
| KR | 10-2008-0012791 A | 2/2008 |
| KR | 10-2009-0053592 A | 5/2009 |
| KR | 10-2009-0065177 A | 6/2009 |
| KR | 10-2009-0113990 A | 11/2009 |

OTHER PUBLICATIONS

Maiyalagan ("Electrochemical synthesis, characterization and electro-oxidation of methanol on platinum nanoparticles supported poly(o-phenylenediamine) nanotubes," Journal of Power Sources, 179(2), pp. 443-450, May 2008).*
Sun et al., "Large scale, templateless, surfactantless route to rapid synthesis of uniform poly(o-phenylenediamine) nanobelts," Chemical Communications 2004, pp. 1182-1183, Apr. 2004.*
Jian Xu et al.; "Solution Route to Inorganic Nonbelt-Conducting Organic Polymer Core-Shell Nanocomposites", Journal of Polymer Science Part A: Polymer Chemistry, 2005, vol. 43, pp. 2892-2900.
Ting-Kai Huang et al., "Growth of Cu Nanobelt and Ag Belt-like Materials by Surfactant-Assisted Galvanic Reductions", Langmuir, 2007, vol. 23, pp. 5722-5726.
Ting-Kai Huang et al., "Glucose Sensing by Electrochemically Grown Copper Nanobelt Electrode", Journal of Electroanalytical Chemistry, 2009, vol. 636, pp. 123-127.
Selvaraj, et al.: "Pt and Pt—Ru nanoparticles decorated polypyrrole/ multiwalled carbon nanotubes and their catalytic activity towards methanol oxidation", Electrochemistry Communications, Elsevier, Amsterdam, NL, vol. 9, No. 5, Apr. 24, 2007, pp. 1145-1153.

\* cited by examiner

Metal layer(the second metal)/Metal nanobelt(the first metal)/Metal layer(the second metal)

Metal particle(the second metal)/Metal nanobelt(the first metal)

AA: Aromatic carbon peak
BB: Carbonyl carbon peak
CC: Propyl SO$_3$H

BELT-SHAPED METAL NANOSTRUCTURE AND METHOD FOR PREPARING SAME

This application is a National Stage Entry of International Application No. PCT/KR2011/001677, filed Mar. 10, 2011, and claims the benefit of Korean Application No. 10-2010-0021856, filed on Mar. 11, 2010, which is hereby incorporated by reference in its entirety for all purposes as if fully set forth herein.

TECHNICAL FIELD

The present invention relates to a belt-shaped metal nanostructure and a method for preparing same. More specifically, the present invention relates to a belt-shaped metal nanostructure that is able to provide a catalyst, etc. having an excellent catalytic activity, and a method for preparing same.

BACKGROUND ART

Nanomaterials refer to the materials whose size unit does not reach the scale of micrometer. They are characterized by having a much larger surface area and relatively higher surface energy than the earlier materials. Such a large surface area and high surface energy greatly influence the physical properties of the material, and make it to have very different characteristics from the corresponding previously known materials.

For example, silver (Ag) nanoparticles may have very different melting points depending on their diameters. That is, they represent a melting point of about 200~300° C. at a diameter of about 20 nm, which is greatly different from about 960.5° C., the previously known melting point of silver (Ag). Furthermore, it is well known that CdTe—a kind of semiconductor materials—shows a very different color of fluorescence in the state of a nanoparticle even by the difference of 1 nm of the particle size.

As such, even though the nanomaterials consist of the same component, it may be expected that they have different crystal size, surface area, color, distribution of crystal face, etc. depending on their particle size, shape, etc. This is why the nanomaterials having different particle size, shape, etc. may be expected to exhibit quite different characteristics despite they consist of the same component.

Thus, it is very important to control the size, shape, composition, etc. of nanomaterials to achieve desired characteristics of the nanomaterials.

On the other hand, since metals have a variety of catalytic activities and high strength as well as an excellent thermal conductivity and electrical conductivity, they have been used as very important materials in the industrial field. In particular, when such metals are obtained as nanomaterials, they can overcome the limits of the earlier metals and show new physical properties. Thus, recently, various researches for the metal nanomaterials have been made.

Among such metal nanomaterials, since nanomaterials or nanostructures containing a noble metal such as platinum (Pt), palladium (Pd), ruthenium (Ru), cobalt (Co), iridium (Ir), rhodium (Rh), etc. exhibit an excellent activity as a catalyst or a sensor, they are widely used as a catalyst in various reaction processes, fuel cells, sensors, etc.

The activity of such a nanomaterial containing a noble metal may be widely different according to the composition of the catalytically active material (e.g., noble metal component) constituting the nanomaterial, surface area of the catalytically active material that can interact with the reactants, crystal structure or size of the catalytically active material, crystal face of the catalytically active material that is exposed on the surface of the catalyst, etc.

In the case of the previously known nanomaterials or nanostructures containing a noble metal, however, they usually have a shape of particle or one-dimensional wire. Unless the content of the catalytically active material (e.g., noble metal component) increases to some level or higher, there is a limit to increasing the surface area of the catalytically active material that can interact with the reactants. Thus, there is a limit to securing an excellent catalytic activity of the nanomaterial containing a noble metal.

It is also true that the earlier nanomaterials or nanostructures containing a noble metal have a limit in selectively exposing the specific crystal face of the catalytically active material (e.g., noble metal component) on the surface of the catalyst due to their limit in the shape, etc.

Therefore, unless the content of the catalytically active material, that is typically expensive, increases to some level or higher, it is difficult to make the catalytic activity of the noble metal-containing nanomaterials excellent, and therefore a catalyst having an excellent activity can hardly be economically and effectively obtained.

CONTENTS OF THE INVENTION

Problems to be Solved

Thus, the present invention relates to a belt-shaped metal nanostructure in which a wide surface area of catalytically active material is realized even by a small amount thereof so that a catalyst having an excellent catalytic activity can be achieved.

The present invention also relates to a method for preparing the metal nanostructure whereby the belt-shaped metal nanostructure can be easily and simply obtained.

Technical Means

Thus, the present invention provides a belt-shaped metal nanostructure which comprises a metal nanobelt containing the first metal and a conductive polymer, in the shape of a belt having a nanoscale thickness, a width larger than the thickness and a length larger than the width; and the second metal coupled to one or both planes of the metal nanobelt defined by said width and length.

The present invention also provides a method for preparing the belt-shaped metal nanostructure which comprises a step of forming the metal nanobelt by reacting a conductive polymer with a salt of the first metal; and a step of reacting the metal nanobelt with a salt of the second metal.

The present invention also provides a catalyst which comprises the belt-shaped metal nanostructure.

Hereinafter, the belt-shaped metal nanostructure, the method for preparing same and the catalyst comprising same, each of which is in accordance with the specific embodiments of the invention, will be explained.

Unless otherwise specified, some terms used in the entirety of the present specification are defined as follows.

The term "metal nanobelt" in the entirety of the present specification refers to a nanostructure which comprises a metal and a conductive polymer and has a shape that is extended lengthwise to any direction like a belt on a plane. The longest straight line distance from one end of the "metal nanobelt" to the other end in the direction along the belt shape may be defined as "length," and the longest straight line distance from one end of the "metal nanobelt" to the other end in the direction perpendicular to the direction of "length" on a plane may be defined as "width." Furthermore, the longest straight line distance between the upper side and the lower side of the belt-shaped metal nanobelt in the direction perpendicular to the plane formed by the "length" and "width" directions may be defined as "thickness." Such a metal nanobelt has a nanoscale size in one or more of the length, width or thickness, or at least in the thickness. It also has a length larger than the width and a width larger than the thickness, and accordingly has the belt shape wherein figures such as thin rectangles, similar polygons, etc. are connected lengthwise like a string.

In the entirety of the present specification, the "(belt-shaped) metal nanostructure" refers to a nanostructure comprising the metal nanobelt as defined above along with other metal coupled to said metal nanobelt. In this "(belt-shaped) metal nanostructure," said other metal may differ from the metal contained in the metal nanobelt.

The expression that the metal nanobelt "is substantially free of a metal oxide" means the case that the "metal" contained in the metal nanobelt is present in the state of not being oxidized and thus the metal nanobelt contains no metal oxide, or the case that only a small amount, e.g., less than about 1 wt %, specifically less than about 0.5 wt %, more specifically 0 wt % to less than 0.1 wt %, each of which is based on the weight of the metal nanobelt, of metal is inevitably oxidized during the process of preparation or use and thus the metal nanobelt contains only the corresponding small amount of metal oxide.

Furthermore, when it is said that a matter "comprises," "contains" or "has" a certain component, it means that the addition of other component is not forbidden and the other component may optionally be added, unless otherwise stated.

One embodiment of the invention provides a belt-shaped metal nanostructure which comprises a metal nanobelt containing the first metal and a conductive polymer, in the shape of a belt having a nanoscale thickness, a width larger than the thickness and a length larger than the width; and the second metal coupled to one or both planes of the metal nanobelt defined by said width and length.

It has been discovered as a result of researches by the present inventors that a certain metal nanobelt can be formed by the reaction of a conductive polymer with a salt of the first metal during which the first metal is reduced, arranged and combined on the conductive polymer, and a new belt-shaped metal nanostructure wherein the second metal which is different from the first metal is coupled to one or both planes of the metal nanobelt (such planes may be the upper or lower plane as defined by the width and length of the metal nanobelt) can be obtained by the reaction of the metal nanobelt with a salt of the second metal.

Such a metal nanostructure basically comprises a metal nanobelt. Differently from the previously known particles or one dimensional nanostructures, the metal nanobelt has a two dimensional shape having a width of some level or higher and being connected lengthwise, like a belt. At the same time, the metal nanostructure shows the characteristics of a metal nanomaterial since it has a thickness of at least nanoscale size. Due to the conformational characteristics of such a metal nanobelt, the belt-shaped metal nanostructure according to one embodiment wherein the second metal is coupled to one or both planes of the metal nanobelt may have a variety of uses as a catalyst, a conductive nanocomponent, etc. as explained below.

When the metal nanostructure contains a noble metal such as platinum (Pt), palladium (Pd), rhodium (Rh), iridium (Ir), cobalt (Co), ruthenium (Ru), etc. (a catalytically active material) as the second metal coupled to the metal nanobelt, such a catalytically active material (i.e., a noble metal) can be uniformly coupled to the wide surface of the metal nanobelt, i.e., one or both planes defined by the wide width of the metal nanobelt. Thus, even though less amount of the catalytically active material is contained than in the previously known particle shape or one dimensional noble metal nanostructure, most of the catalytically active material coupled to the wide plane of the metal nanobelt can be exposed on the surface of the metal nanostructure. According to this, although the content of the catalytically active material in the metal nanostructure is reduced, the surface area of the catalytically active material that can interact with the reactant may be more increased so that the metal nanostructure can exhibit a superior catalytic activity.

Also, as explained below more in detail, the specific crystal face of the first or the second metal usually combines with the conductive polymer to form the metal nanobelt and the metal nanostructure comprising same during the process for preparing the metal nanostructure. Such a specific crystal face may be the crystal face having a big absolute value of capping energy with the conductive polymer among the crystal faces of metal nanocrystals of the first or the second metal. Using this theory, the kinds of conductive polymer and the second metal may be suitably controlled to give the metal nanostructure in the shape that the specific crystal face of the second metal is selectively coupled to the metal nanobelt. Also, by this method, it is possible to control a certain crystal face of the second metal (e.g., a certain crystal face in the opposite side to the specific crystal face coupled to the metal nanobelt) to be selectively exposed on the surface of the metal nanostructure.

Thus, the metal nanostructure can be provided in the shape that a certain crystal face of the second metal usually having a superior catalytic activity (e.g., a catalytically active material such as a noble metal) is selectively exposed on the surface, and can exhibit a superior catalytic activity even by a low content of the catalytically active material. Therefore, the metal nanostructure enables provision of various catalysts showing a superior activity even by a low content of the catalytically active material.

On the other hand, when a highly conductive metal such as gold (Au), silver (Ag), platinum (Pt) or copper (Cu) is used as the second metal, the metal nanostructure can be preferably used for forming a variety of conductive patterns, or conductive membranes. Hitherto, the conductive patterns, etc. have been formed by printing the conductive ink containing metal nanoparticles on a substrate and subjecting it to high temperature calcinations to connect the particles. However, the metal nanostructures according to one embodiment of the invention are themselves connected in a belt shape having a width and length of some level or higher and thus can show a superior conductivity. Thus, if the conductive ink containing such a metal nanostructure is printed, conductive patterns or conductive membranes having a superior conductivity can be formed with no additional high temperature calcinations.

In particular, since the highly conductive second metal can be uniformly coupled to the wide plane of the metal nanobelt, the metal nanostructure enables the formation of superior conductive patterns or conductive membranes even when the content of the highly conductive metal is relatively low.

The belt-shaped metal nanostructure according to one embodiment of the invention will be explained more in detail below.

The belt-shaped metal nanostructure comprises a metal nanobelt containing a conductive polymer and the first metal. The metal nanobelt has a thickness of at least nanoscale, a width larger than the thickness and a length larger than the width, and thus it has a belt shape as a whole. Such a metal nanobelt defines the whole belt shape of the metal nanostructure, and the second metal mentioned below is coupled to the plane to form the metal nanostructure.

More specifically, the metal nanobelt may have a length of about 100 nm or more, a length/width ratio of about 10 or more and a width/thickness ratio of about 2 or more. As a more specific example, the metal nanobelt may have a length of about 100 nm~2000 μm, preferably a length of about 1 μm~1000 μm, more preferably a length of about 2 μm~100 μm. Also, the metal nanobelt may have a width of about 10 nm~100 μm, preferably a width of about 10 nm~10 μm, more preferably a width of about 10 nm~2 μm. And, the metal nanobelt may have a thickness of about 5~500 nm, preferably a thickness of about 5~300 nm, more preferably a thickness of about 5~250 nm.

The metal nanobelt may have a length/width ratio of about 10 to 20000, preferably about 10 to 1000, more preferably about 10 to 200. Also, the metal nanobelt may have a width/thickness ratio of about 2 to 6000, preferably about 3 to 500, more preferably about 3 to 50.

As above, since the metal nanobelt has a relatively wide width and may have a belt shape which is connected to the length of minimum 100 nm to 100 μm and maximum 2000 μm, it can have a larger surface area than the previously known nanostructures having the particle or one dimensional shape. Thus, as explained above, the belt-shaped metal nanostructure comprising such a metal nanobelt enables the provision of catalysts or conductive patterns, etc. showing superior characteristics even under a relatively low content of the second metal (a noble metal or highly conductive metal showing a catalytic activity).

Furthermore, the metal nanobelt is formed basically by the reaction of the conductive polymer with a salt of the first metal. By the control of degree of reaction between the conductive polymer with the salt of the first metal, the scale (i.e., length, width or thickness) of the metal nanobelt may be controlled in various ways. Thus, various catalysts, conductive patterns, etc. can be provided by easily controlling the characteristics of metal nanostructure comprising the metal nanobelt.

The metal nanobelt may be substantially free of a metal oxide. Here, the meaning of "be substantially free of a metal oxide" is as defined above. As explained below, since the metal nanobelt may be formed by the reaction of the salt of the first metal with the conductive polymer under normal temperature and pressure or the same low temperature and pressure, it can be provided with minimum oxidation of metal which is caused by the high temperature reaction process. Thus, the metal nanobelt is substantially free of a metal oxide and may contain the metal itself and the conductive polymer. According to this, the metal nanobelt and metal nanostructure comprising same exhibit a superior conductivity, etc. and can be advantageously used for the formation, etc. of conductive patterns.

As explained more in detail below, the metal nanobelt may be prepared by reacting the conductive polymer with the salt of the first metal to reduce and combine the first metal on the conductive polymer. Thus, the first metal contained in the metal nanobelt may include any metal that can be reduced on the conductive polymer, for example, gold (Au), silver (Ag), platinum (Pt), copper (Cu), etc.

In addition, since the metal nanobelt is formed through the arrangement of metal on the conductive polymer, plural metal components do not need to be contained for some of them to constitute the backbone or basic mold of the metal nanobelt. The metal nanobelt may contain a single metal component. In other words, a single metal can be used as the first metal. For that reason, the metal nanobelt containing only a single metal component that is suitable for the field of application can be easily obtained and appropriately applied to various fields such as catalysts, conductive patterns, etc. by controlling characteristics of the metal nanostructure comprising the metal nanobelt.

As the conductive polymer contained in the metal nanobelt, any polymer that can react with the salt of the first metal to combine with the first metal and shows a superior conductivity can be used. The conductive polymer may include polypyrrole, polyaniline, polythiophene, copolymers thereof, etc.

On the other hand, the belt-shaped metal nanostructure comprises the second metal coupled to one or both planes of the metal nanobelt (such planes may be the upper or lower plane of the metal nanobelt as defined by its width and length), along with the above explained metal nanobelt.

The second metal is in a form of reduced metal which can be physically or chemically coupled to the conductive polymer, etc. contained in the metal nanobelt. The second metal may be coupled to one or both planes of the metal nanobelt in a shape of metal layer having a nanoscale thickness like the metal nanostructure of one embodiment as depicted in FIG. 1a, but may be coupled in a shape of metal nanoparticle like the other example as depicted in FIG. 1b.

The characteristics of the metal nanostructure may also be controlled in various ways through the adjustment of the coupling form of the second metal, and such a metal nanostructure can be suitably applied to a variety of fields.

Also, any typical noble metals, highly conductive metals, etc. may be used as the second metal without special limitation depending on the purpose of application of the metal nanostructure. For example, when the metal nanostructure is to be used as a catalyst, one or more selected from platinum (Pt), palladium (Pd), rhodium (Rh), iridium (Ir), cobalt (Co), ruthenium (Ru), etc. or their alloys may be used. When the metal nanostructure is used for forming a conductive pattern, etc., one or more selected from gold (Au) and/or silver (Ag) or their alloys may be used. When two or more metals are used as the second metal, these metals may be coupled to the metal nanobelt in any form such as complex layer, multi-layer, alloy layer, metal particle, alloy particle, etc., and thus the metal nanostructure having a variety of functions and utilities can be provided even through the control of such a form of coupling.

As explained above, the belt-shaped metal nanostructure according to one embodiment of the invention can show a variety of functions by coupling the second metal to the metal nanobelt. For example, if a highly conductive metal is used as the second metal, conductive films such as various conductive patterns, conductive membranes, etc. having a superior conductivity can be formed when the conductive ink containing such a metal nanostructure is printed on any substrate made of polymer, glass, metal, etc. even without the additional high temperature calcinations, etc. In particular, such characteristics may be obtained even by a relatively low content of the highly conductive metal, the high temperature calcination does not need to be done, and the conductive ink may be applied to a substrate made of any material to form a variety of conductive patterns or conductive membranes. Thus, the metal nanostructure may be preferably applied for forming various conductive films included in a variety of display devices such as PDP, LCD, etc., semiconductor device, solar cell, etc., e.g., various conductive membranes or conductive patterns such as a variety of electrode, wiring, electromagnetic shielding film, etc. Furthermore, since the metal nanostructure can exhibit a superior thermal conductivity depending on the type of the second metal, it may be applied for forming various thermal conductive films.

When the noble metal having a catalytic activity is used as the second metal, the aforementioned metal nanostructure may be particularly preferably applied as reaction catalysts of every kind in oxidation/reduction reactions, catalysts for fuel cells, catalysts for electrochemical sensors, etc. In particular, the metal nanostructure can realize a wide surface area of the catalytically active material even when the catalytically active material such as a noble metal is contained in a relatively small amount, whereby the crystal face area of the noble metal, etc. exposed on the surface of the metal nanostructure can be maximized. Thus, the metal nanostructure can provide catalysts of every kind showing a superior activity.

The constitutions of conductive inks, conductive patterns, conductive films, thermal conductive films, catalysts, etc., each of which comprise the aforementioned metal nanostructure, may follow the conventional constitutions obviously known to the skilled artisan. Thus, more specific explanations thereon are omitted here.

On the other hand, according to other embodiment, the present invention provides a method for preparing the aforementioned belt-shaped metal nanostructure. The method for preparing such a metal nanostructure may comprise a step of forming the metal nanobelt by reacting a conductive polymer with a salt of the first metal; and a step of reacting the metal nanobelt with a salt of the second metal.

As a result of experiments by the present inventors, it has been discovered that the aforementioned metal nanobelt comprising the first metal and conductive polymer can be prepared by the reaction of the conductive polymer with a salt of the first metal, and the belt-shaped metal nanostructure according to one embodiment of the invention can be prepared by the reaction of the metal nanobelt with a salt of the second metal.

First, during the reaction of the conductive polymer with the salt of the first metal, the first metal having a relatively high reduction potential is reduced from its salt, arranged and combined on the conductive polymer to give the metal nanobelt. In other words, the metal is reduced through the mediation of the conductive polymer to form fine metal particles which are then connected in a belt shape having a wide width on the conductive polymer to give the metal nanobelt.

The unlimited principle for the formation of the metal nanobelt will be explained more in detail below.

In the above reaction process, after the first metal is reduced, the conductive polymer is combined with the specific crystal face of the metal nanocrystal to stabilize the high surface energy of the metal nanocrystal of the first metal. Such stabilizing energy is called as capping energy, and the capping energy may vary depending on the types of the conductive polymer, the first metal, metal nanocrystal, crystal face, etc. Also, since the surface energy can be more stabilized through the combination of the conductive polymer with the crystal face of metal nanocrystal as the absolute value of the capping energy becomes higher, the conductive polymer combines with the specific crystal face having the biggest absolute value of the capping energy with the conductive polymer among the crystal faces of the metal nanocrystals of the first metal.

Under such a principle, the specific crystal face of the first metal mainly combines with the conductive polymer, while the first metal is arranged on the conductive polymer in the direction of the other crystal face to form the metal nanobelt as a result thereof.

In particular, the metal nanobelt can be prepared via a simple reaction process since the reactants are reacted in a dispersion of normal temperature and pressure as a single step without requiring high temperature and pressure, and furthermore, as explained below, it can be easily prepared under normal temperature and pressure or the same low temperature and pressure.

On the other hand, after the metal nanobelt is prepared by the above mentioned reaction process, it is reacted with the salt of the second metal during which the second metal may be arranged and coupled to one or both planes of the metal nanobelt while the metal is reduced on the metal nanobelt. As a result of such a reaction process, the aforementioned belt-shaped metal nanostructure can be obtained.

Also, in the reaction step with the salt of the second metal, the specific crystal face of the second metal can mainly combine with the conductive polymer or the metal nanobelt comprising same under the influence of the aforementioned capping energy, etc., and thus the metal nanostructure may be prepared in the shape that the specific crystal face of the second metal is selectively exposed on the surface.

Using the characteristics, as explained above, the metal nanostructure can be provided in the shape that the specific crystal face of the second metal mainly related to a superior catalytic activity (e.g., a catalytically active material such as a noble metal) is selectively exposed on the surface and can exhibit a superior catalytic activity.

In the above mentioned processes, the reaction step of the conductive polymer with the salt of the first metal may be carried out for about 0.1 h to 60 days under the temperature of about 0 to 70° C. and the pressure of about 1 to 2 atm, preferably for about 5 h to 14 days under the temperature of about 1 to 65° C. and the normal pressure (about 1 atm). As this reaction step is carried out under normal temperature and pressure or the same relatively low temperature and pressure, the first metal is slowly and uniformly reduced and arranged on the conductive polymer to suitably prepare the metal nanobelt. Differently from this, if the reaction temperature or pressure is too low, the metal nanobelt may not be suitably formed. Also, if the reaction temperature or pressure is too high, the reaction between the conductive polymer and metal salt becomes too fast. According to this, it may be difficult for the metal to be uniformly arranged and combined on the conductive polymer, and capping effect of the conductive polymer for the crystal face according to the stabilization of the surface energy is reduced. As a result, the metal or conductive polymer agglomerates with each other to form nanostructures having other shapes, such as for example, spherical metal nanoparticles, more than the belt-shaped metal nanobelt, which may lower the yield of metal nanobelt.

Also, the reaction step of the metal nanobelt with the salt of the second metal may be carried out for about 1 sec to 60 days under the temperature of about 0 to 100° C. and the pressure of about 1 to 2 atm, preferably for about 1 min to 14 days under the temperature of about 1 to 70° C. and the pressure of about 1 to 2 atm (e.g., normal pressure of about 1 atm). As this reaction step is carried out under such conditions, the belt-shaped metal nanostructure wherein the second metal is suitably coupled to the plane of the metal nanobelt can be obtained in a high yield. Controlling appropriately such reaction conditions, the degree or form of coupling of the second metal to the metal nanobelt may be controlled. Such control of reaction conditions is apparent for a skilled artisan.

In the reaction step for forming the metal nanobelt, the conductive polymer is mixed with the salt of the first metal to form a dispersion, and this dispersion is kept under constant temperature and pressure during which the reaction of the conductive polymer and the salt of the first metal proceeds. After this reaction step, the salt of the second metal is added to the dispersion of metal nanobelt which is kept under constant temperature and pressure to proceed the reaction with the salt of the second metal. As a result, the belt-shaped metal nanostructure can be obtained.

The types of conductive polymer, the first metal and the second metal that can be used in the above process are as mentioned above, and thus more specific explanation thereon is omitted here.

As the salt of the first or the second metal, any conventional one that used to be utilized as a precursor for forming the metal nanoparticle, etc. can be used without special limitation. For example, the salt of the first or the second metal may include nitrate, sulfate, acetate, halide, carbonate, lactate, cyanide, cyanate, sulfonate, etc. of the metal.

More specifically, when silver (Ag) is used as the first or the second metal, the salt of this first or second metal may include silver nitrate ($AgNO_3$), silver sulfate ($Ag_2SO_4$), silver acetate ($Ag(CH_3COO)$), or silver halide such as silver fluoride (AgF), silver chloride (AgCl), silver bromide (AgBr) or silver iodide (AgI), silver cyanide (AgCN), silver cyanate (AgOCN), silver lactate ($Ag(CH_3CHOHCOO)$), silver carbonate ($Ag_2CO_3$), silver perchlorate ($AgClO_4$), silver trifluoroacetate ($Ag(CF_3COO)$), silver trifluoromethylsulfonate ($Ag(CF_3SO_3)$), etc. When the noble metal such as platinum (Pt) is used as the first or the second metal, $K_2PtCl_4$, etc. may be used.

However, it is obvious that the salt of every kind of the first or the second metal can be used in addition to the above exemplified salts.

In the reaction step of the conductive polymer with the salt of the first metal or the metal nanobelt with the salt of the second metal, the reactants only may be reacted, but one step or more among them may also be carried out in the presence of a reducing agent.

When the reduction potential of the first metal is relatively low, if the conductive polymer is reacted with the salt of the first metal in the presence of a reducing agent, the first metal can be more effectively reduced on the conductive polymer to make the reaction faster with higher yield. Accordingly, the metal nanobelt may be easily obtained in a high yield.

Also, when the reduction potential of the second metal is relative low in comparison to each component contained in the metal nanobelt, the reaction step with the salt of the second metal may be carried out in the presence of a reducing agent. Accordingly, the second metal can be more easily reduced to be coupled to the metal nanobelt and to give the belt-shaped metal nanostructure having suitable characteristics in a high yield.

The type of reducing agent that can be used in each reaction step may vary depending on the type of the first or the second metal. The reducing agent having a lower standard reduction potential than the salt of the first or the second metal or the corresponding metal ion may be selected to reduce the salt of the first or the second metal. Specific examples of the reducing agent may include polyphenol compounds such as hydrazine, ascorbic acid, hydroquinone, resorcinol, catechol, etc.; amine compounds such as triethylamine; pyridine compounds such as dimethylaminopyridine; aldehyde compounds such as formaldehyde; polyhydric alcohol compounds such as ethylene glycol, etc., or mixtures of two or more selected therefrom. However, reducing agents of every kind depending on the type of the first or the second metal may also be used.

Also, the reaction step of the conductive polymer with the salt of the first metal or the reaction step of the metal nanobelt with the salt of the second metal may be carried out in a solvent or a mixture of one or more solvents, wherein the solvent may be selected from the group consisting of water, alcohol, acetone, methyl ethyl ketone (MEK), ethylene glycol, formamide ($HCONH_2$), dimethylformamide (DMF), dimethylacetamide (DMAc), dimethyl sulfoxide (DMSO) and N-methylpyrrolidone (NMP).

For example, in case of the water-soluble conductive polymer such as polyaniline, this is dispersed in water and the salt of the first metal is added to the dispersion to proceed the reaction for forming the metal nanobelt. The metal nanobelt thus formed is dispersed in water or other various solvents and the salt of the second metal is added thereto to carry out the subsequent reaction step. Also, depending on the type of the conductive polymer, the first metal or the second metal, various solvents as listed above or previously known may be used to give the dispersion of reactants and to carry out each reaction step.

Here, the salt of the first or the second metal may be added in a solid state or in a state of a solution. If each dispersion thus obtained is kept for some time under the aforementioned conditions of temperature and pressure, the metal nanobelt and the belt-shaped metal nanostructure can be formed in the dispersion, respectively. The order of addition of the reactants, method for forming the dispersion, the mixing order, etc. in each of the reaction steps may be obviously changed within the conventional range by a skilled artisan.

The belt-shaped metal nanostructure prepared by the aforementioned process may be mixed with a solvent to be provided as conductive ink compositions that can be printed, various catalysts, etc.

Among the above, the conductive ink composition may be preferably applied for forming various conductive membranes or conductive patterns such as electrode, wiring, electromagnetic shielding film, etc. included in a variety of display devices such as PDP, LCD, etc., semiconductor devices, solar cells, etc., or various conductive films such as thermal conductive films. For example, the conductive ink composition may be printed on a transparent substrate to form a transparent conductive membrane included in a touch panel, applied for forming various electrodes or wiring patterns of semiconductor substrates, or applied for forming various wiring patterns, electrodes, electromagnetic shielding filters, etc. of various display devices. In particular, since the conductive ink composition comprises the belt-shaped metal nanostructure showing by itself a superior conductivity without high temperature calcinations, it can be more preferably applied under the circumstance of requiring low temperature calcinations. Since the high temperature calcinations are not required, any type of substrate can be used without limitation.

Also, the metal nanostructure may be used as reaction catalysts of every kind in oxidation/reduction reactions, catalysts for fuel cells, catalysts for electrochemical sensors, etc., and may comprise any suitable second metal depending on the type of catalyst. This metal nanoprecursor shows a relatively more excellent activity even when it contains a low amount of catalytically active material.

On the other hand, the conductive ink composition, catalyst, etc. comprising the aforementioned metal nanoprecursor may have the constitution of the conductive ink composition or catalyst conventionally known to the skilled artisan except that they comprise the belt-shaped metal nanoprecursor instead of the conventional metal nanoparticle or nanostructure having any other shape.

Effect of the Invention

As explained above, the present invention provides a new metal nanostructure that enables provision of a catalyst showing a superior activity even by a low content of the catalytically active material, and a method for preparing same.

Also, the metal nanostructure may be used very advantageously for forming a variety of conductive patterns, conductive membranes, thermal conductive films, etc.

BEST MODE FOR CARRYING OUT THE INVENTION

The action and effect of the present invention will be illustrated more in detail by means of the following Examples. However, these Examples are provided only to assist the understanding of the present invention but it is not intended that the scope of the present invention is limited in any manner by them.

A. Preparation of Chemicals

Chemicals used for preparing the silver nanobelt are as follows and they were used after purchase without special purification:

aniline hydrochloride (Aldrich, 97%), 2-aminobenzoic acid (Aldrich, 99%), 1,3-phenylenediamine (Aldrich, 99+%), 1,3-propane sultone(Aldrich, 98%), ammonium persulfate (Acros, 98%), $K_2PtCl_4$ (Aldrich), $Pd(NO_3)_2.2H_2O$ (Aldrich, ~40% Pd basis), $AuCl_3$ (Aldrich, 99%), HCl (Duksan), $HNO_3$ (Duksan), $AgNO_3$ (Acros, 99%)

B. Synthesis of Conductive Polymer

Synthesis 1. Synthesis of
N-(1',3'-phenylenediamino)-3-propane sulfonate

In a 1 L flask, m-phenylenediamine (54.07 g, 0.500 mol) and 1,3-propane sultone (61.07 g, 0.500 mol) were dissolved in THF (500 ml) and stirred for 24 h under reflux. The mixture was cooled to room temperature, filtered through a glass filter, washed with a solvent mixture of THF:n-Hex (1:1, v/v, 1000 ml) and dried under vacuum to give a powder (108.52 g, 0.472 mol, 94.3% yield) having a grayish blue color. N-(1',3'-phenylenediamino)-3-propane sulfonate thus obtained has the same chemical structure as the final compound of the following reaction scheme a).

Reaction Scheme a): N-(1',3'-phenylenediamino)-3-propane sulfonate

Figure 1A:
FIGS. 1a and 1b each represent general diagrams for the belt-shaped metal nanostructures according to one example and other example of the invention
Figure 1B:
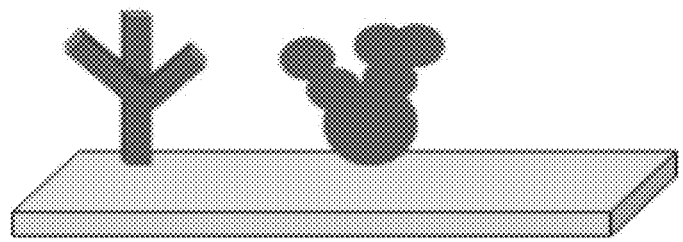
Figure 2:
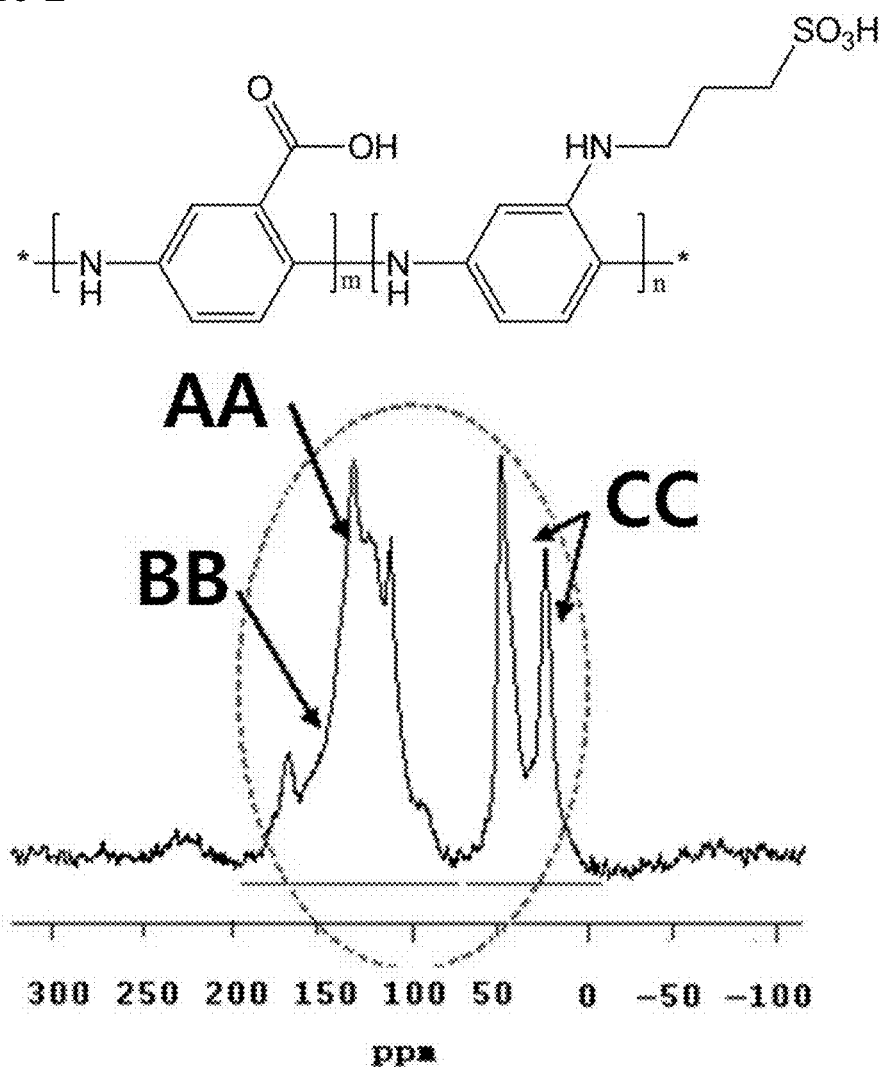
FIG. 2 represents the solid state carbon NMR spectrum of the conductive polymer obtained in Synthesis 2.

Synthesis 2. Synthesis of P[anthranilic acid]$_{0.5}$-[N-(1',3'-phenylenediamino)-3-propane sulfonate]$_{0.5}$ Anthranilic acid (3.43 g) and N-(1',3'-phenylenediamino)-3-propane sulfonate (5.75 g) obtained in Synthesis 1 were dissolved in a mixed solution of 0.2 M HCl solution (300 ml) and EtOH (100 ml). To this solution was added over 10 min 0.2 M HCl solution (200 ml) wherein ammonium persulfate (14.21 g) was dissolved, which was then stirred for 24 h. This solution was added to acetone (3.6 L) to give a polyaniline polymer precipitate. The precipitate was separated by centrifugation under 4000 rpm for 1 h, washed three times with acetone/0.2 M HCl mixed solution (6:1 v/v) and dried to give 6.12 g of P[anthranilic acid]$_{0.5}$-N-(1',3'-phenylenediamino)-3-propane sulfonate]$_{0.5}$ (66.4% yield). It was identified that the ratio of two repeating units in the resulting polyaniline was 52:48 (analyzed by solid state NMR) and its weight average molecular weight was about 2830 (GPC analysis). The solid state carbon NMR spectrum of this conductive polymer was depicted in FIG. 2. Also, the conductive polymer of P[anthranilic acid]$_{0.5}$-[N-(1',3'-phenylenediamino)-3-propane sulfonate]$_{0.5}$ was identified to have the same chemical structure as the final compound of the following reaction scheme b).

Reaction Scheme b): P[anthranilic acid]$_{0.5}$-[N-(1',3'-phenylenediamino)-3-propane sulfonate]$_{0.5}$

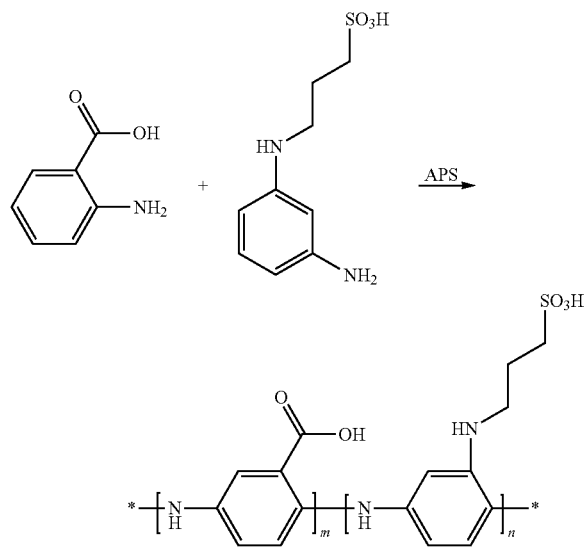

C. Synthesis of Belt-Shaped Metal Nanostructure

EXAMPLE 1

Synthesis of Silver (Ag) Nanobelt

The conductive polymer P[anthranilic acid]$_{0.5}$-[N-(1',3'-phenylenediamino)-3-propane sulfonate]$_{0.5}$ (25 mg) prepared in Synthesis 2 and AgNO$_3$ (100 mg) were dispersed in distilled water (50 ml) and kept at 25° C. for 7 days. The silver nanobelt mass sunk on the ground was filtered through a filter paper, washed with distilled water (50 ml) and dried well to give the purified silver nanobelt (16 mg).

Figure 3:
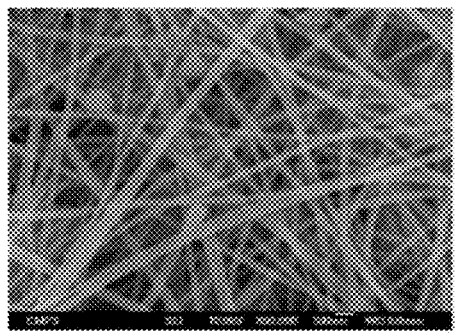
FIG. 3 represents the SEM image of the silver nanobelt obtained in Example 1.
Figure 4:
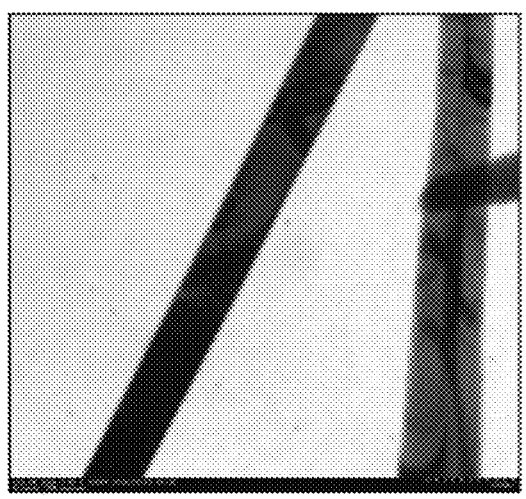
FIG. 4 represents the TEM image of the silver nanobelt obtained in Example 1.

FIG. 3 represents the SEM image of the silver nanobelt obtained in Example 1, and FIG. 4 represents the TEM image thereof. The silver nanobelt thus obtained was analyzed by SEM to confirm that it has a belt shape whose scale is 40~60 nm width, 10~20 nm thickness and 1 μm or more length (provided that the width/thickness ratio=3 or more).

EXAMPLE 2

Synthesis of Belt-Shaped Metal Nanostructure
(Comprising Platinum Nanoparticles Coupled to the Plane of Silver Nanobelt)

The silver nanobelt (16 mg) obtained in Example 1 was dispersed in distilled water (50 ml), and K$_2$PtCl$_4$ 1 mM aqueous solution (10 ml) was added thereto. This solution was kept for 10 h at room temperature and then centrifuged at a rate of 3000 rpm for 10 min. The solution was drained, and the precipitate was washed with distilled water (50 ml) and dried to give the belt-shaped metal nanostructure comprising platinum nanoparticles coupled to the plane of the silver nanobelt. The SEM image of the belt-shaped metal nanostructure thus obtained was represented in FIG. 5, and the TEM image thereof was represented in FIG. 6. Also, the EDX spectrum of the belt-shaped metal nanostructure was represented in FIG. 7. The composition of the metal nanostructure was analyzed from the EDX spectrum and shown in the following Table 1.

TABLE 1

| Element | Weight % | Atomic % |
|---|---|---|
| C | 3.33 | 27.27 |
| Ag | 58.69 | 53.56 |
| Pt | 37.98 | 19.17 |
| Totals | 100.00 | 100.00 |

Figure 5:
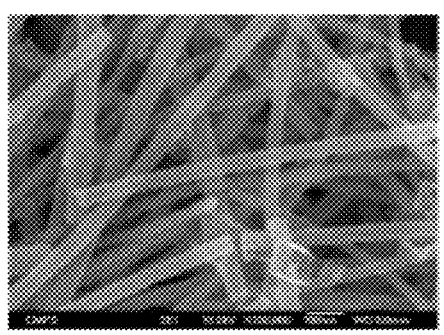
FIG. 5 represents the SEM image of the belt-shaped metal nanostructure according to Example 2, which has a structure comprising the platinum nanoparticles coupled to the plane of the silver nanobelt.
Figure 6:
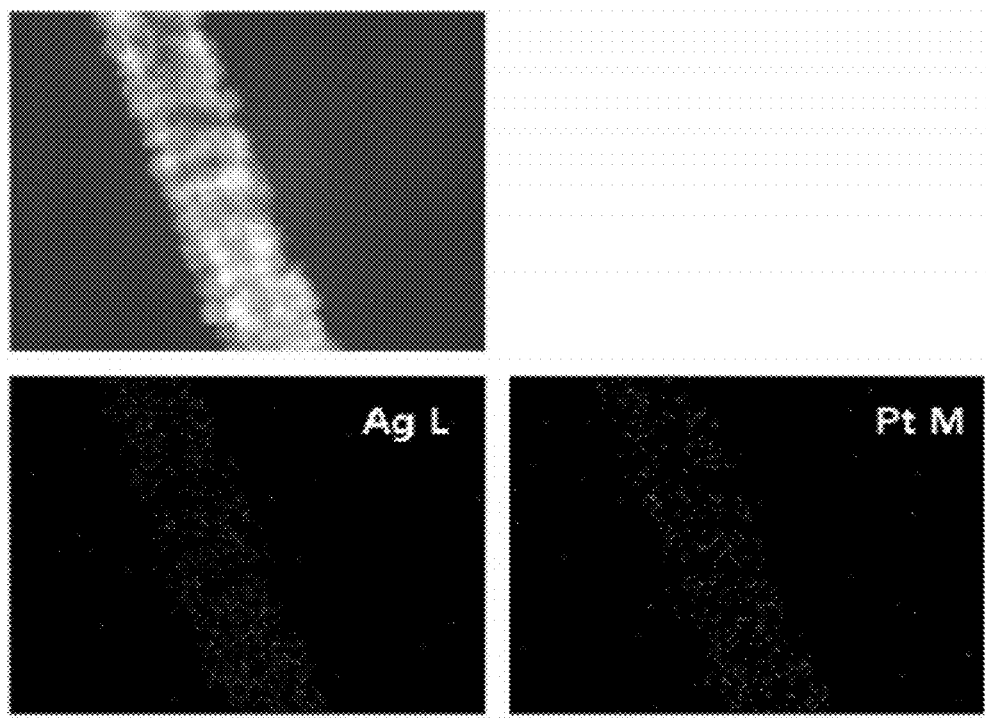
FIG. 6 represents the TEM image of the belt-shaped metal nanostructure according to Example 2.
Figure 7:
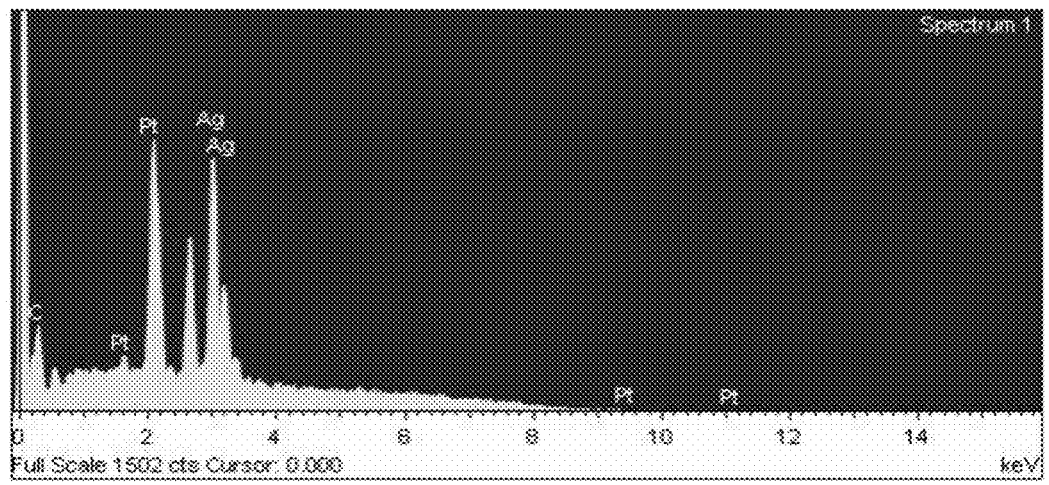
FIG. 7 represents the EDX spectrum of the belt-shaped metal nanostructure according to Example 2.

Furthermore, it was confirmed from the above composition of the metal nanostructure thus analyzed, the SEM and TEM images of FIGS. 5 and 6 that the belt-shaped metal nanostructure has the structure wherein the platinum nanoparticles are coupled to the plane of the silver nanobelt of Example 1.

EXAMPLE 3

Synthesis of Belt-Shaped Metal Nanostructure
(Comprising Platinum Nanoparticles Coupled to the Plane of Silver Nanobelt)

The same procedure as Example 2 was carried out except that K$_2$PtCl$_4$ 0.1 mM aqueous solution was used instead of 1 mM aqueous solution thereof to give the belt-shaped metal nanostructure comprising platinum nanoparticles coupled to the plane of the silver nanobelt. The SEM image of the belt-shaped metal nanostructure thus obtained was represented in FIG. 8, and the EDX spectrum thereof was represented in FIG. 9. The composition of the metal nanostructure was analyzed from the EDX spectrum and shown in the following Table 2.

TABLE 2

| Element | Weight % | Atomic % |
|---|---|---|
| C | 4.34 | 29.42 |
| Ag | 91.04 | 68.66 |
| Pt | 4.61 | 1.92 |
| Totals | 100.00 | 100.00 |

Figure 8:
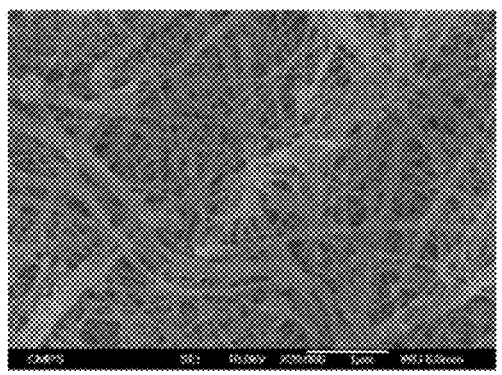
FIG. 8 represents the SEM image of the belt-shaped metal nanostructure according to Example 3.
Figure 9:
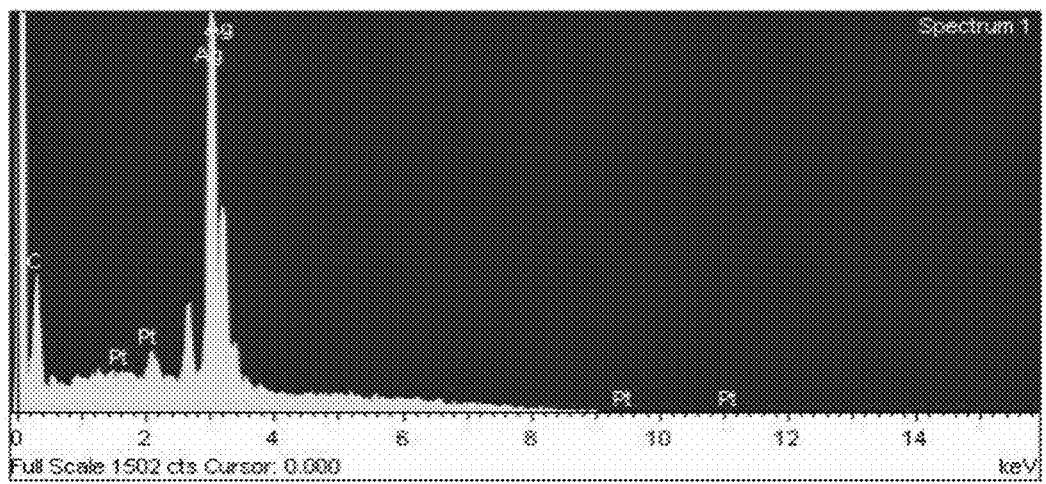
FIG. 9 represents the EDX spectrum of the belt-shaped metal nanostructure according to Example 3.

Furthermore, it was confirmed from the above composition of the metal nanostructure thus analyzed and the SEM image of FIG. 8 that the belt-shaped metal nanostructure has the structure wherein the platinum nanoparticles are coupled to the plane of the silver nanobelt of Example 1.

EXAMPLE 4

Synthesis of Belt-Shaped Metal Nanostructure
(Comprising Platinum Nanoparticles Coupled to the Plane of Silver Nanobelt)

Figure 10:
FIG. 10 represents the TEM image of the belt-shaped metal nanostructure according to Example 4.

The same procedure as Example 2 was carried out except that K$_2$PtCl$_4$ 0.01 mM aqueous solution was used instead of 1 mM aqueous solution thereof to give the belt-shaped metal nanostructure comprising platinum nanoparticles coupled to the plane of the silver nanobelt. The TEM image of the belt-shaped metal nanostructure thus obtained was represented in FIG. 10. From this TEM image of FIG. 10, it was confirmed that the belt-shaped metal nanostructure has the structure wherein the platinum atoms are coated on the plane of the silver nanobelt of Example 1.

EXAMPLE 5

Synthesis of Belt-Shaped Metal Nanostructure (Comprising Palladium Nanoparticles Coupled to the Plane of Silver Nanobelt)

Figure 11:
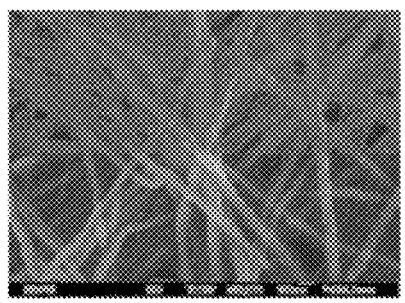
FIG. 11 represents the SEM image of the belt-shaped metal nanostructure according to Example 5, which has a structure comprising the palladium nanoparticles coupled to the plane of the silver nanobelt.
Figure 12:
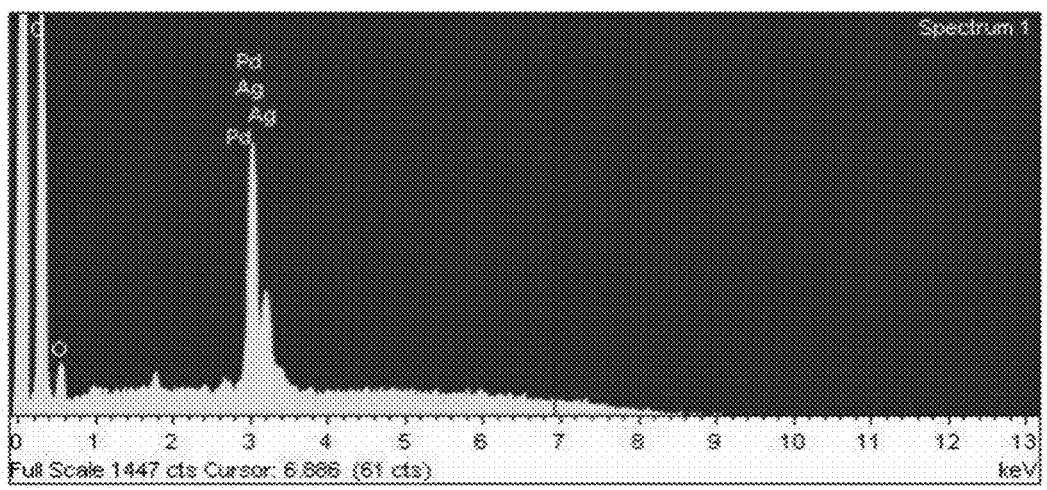
FIG. 12 represents the EDX spectrum of the belt-shaped metal nanostructure according to Example 5.

The silver nanobelt (16 mg) obtained in Example 1 was dispersed in distilled water (50 ml), and $Pd(NO_3)_2 \cdot 2H_2O$ 1 mM aqueous solution (10 ml) was added thereto. This solution was kept for 10 h at room temperature and then centrifuged at a rate of 3000 rpm for 10 min. The solution was drained, and the precipitate was washed with distilled water (50 ml) and dried to give the belt-shaped metal nanostructure comprising palladium nanoparticles coupled to the plane of the silver nanobelt. The SEM image of the belt-shaped metal nanostructure thus obtained was represented in FIG. 11. Also, the EDX spectrum of the belt-shaped metal nanostructure was represented in FIG. 12. The composition of the metal nanostructure was analyzed from the EDX spectrum and shown in the following Table 3.

TABLE 3

| Element | Weight % | Atomic % |
|---|---|---|
| C | 15.42 | 53.87 |
| Ag | 76.70 | 29.84 |
| Pd | 1.96 | 0.77 |
| O | 5.91 | 15.52 |
| Totals | 100.00 | 100.00 |

EXAMPLE 6

Synthesis of Belt-Shaped Metal Nanostructure (Comprising Palladium Nanoparticles Coupled to the Plane of Silver Nanobelt)

Figure 13:
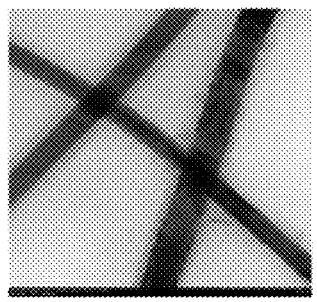
FIG. 13 represents the TEM image of the belt-shaped metal nanostructure according to Example 6.

The same procedure as Example 5 was carried out except that $Pd(NO_3)_2 \cdot 2H_2O$ 0.01 mM aqueous solution was used instead of 1 mM aqueous solution thereof to give the belt-shaped metal nanostructure comprising palladium nanoparticles coupled to the plane of the silver nanobelt. The TEM image of the belt-shaped metal nanostructure thus obtained was represented in FIG. 13. From this TEM image of FIG. 13, it was confirmed that the belt-shaped metal nanostructure has the structure wherein the palladium nanoparticles are coupled to the plane of the silver nanobelt of Example 1.

EXAMPLE 7

Synthesis of Belt-Shaped Metal Nanostructure (Comprising Gold Nanoparticles Coupled to the Plane of Silver Nanobelt)

Figure 14:
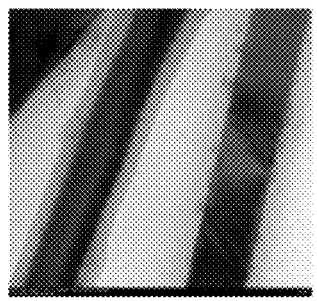
FIG. 14 represents the TEM image of the belt-shaped metal nanostructure according to Example 7, which has a structure comprising the gold nanoparticles coupled to the plane of the silver nanobelt.

The same procedure as Example 5 was carried out except that $AuCl_3$ 0.01 mM aqueous solution was used instead of $Pd(NO_3)_2 \cdot 2H_2O$ 1 mM aqueous solution to give the belt-shaped metal nanostructure comprising gold nanoparticles coupled to the plane of the silver nanobelt. The TEM image of the belt-shaped metal nanostructure thus obtained was represented in FIG. 14. From this TEM image of FIG. 14, it was confirmed that the belt-shaped metal nanostructure has the structure wherein the gold nanoparticles are coupled to the plane of the silver nanobelt of Example 1.

The invention claimed is:

1. A belt-shaped metal nanostructure which comprises
   a metal nanobelt containing a first metal and a conductive polymer, in the shape of a belt having a nanoscale thickness, a width larger than the thickness and a length larger than the width;
   a second metal coupled to one or both planes of the metal nanobelt defined by said width and length; and
   the first metal and the second metal are different from each other,
   wherein the conductive polymer is a copolymer of anthranilic acid and N-(1', 3'-phenylenediamino)-3-propane sulfonate.

2. The belt-shaped metal nanostructure according to claim 1 wherein the metal nanobelt has a length of 100 nm or more, a length/width ratio of 10 or more and a width/thickness ratio of 2 or more.

3. The belt-shaped metal nanostructure according to claim 1 wherein the metal nanobelt has a length of 100 nm~2000 μm, a width of 10 nm~100 μm and a thickness of 5 nm~500 nm.

4. The belt-shaped metal nanostructure according to claim 1 wherein the second metal is coupled to one or both planes of the metal nanobelt in a shape of metal layer having a nanoscale thickness.

5. The belt-shaped metal nanostructure according to claim 1 wherein the second metal is coupled to one or both planes of the metal nanobelt in a shape of metal nanoparticle.

6. The belt-shaped metal nanostructure according to claim 1 wherein
   the first metal is a metal selected from the group consisting of gold (Au), silver (Ag), platinum (Pt) and cupper (Cu), and
   the second metal is one or more metals selected from the group consisting of gold (Au), silver (Ag), platinum (Pt), palladium (Pd), rhodium (Rh), iridium (Ir), cobalt (Co) and ruthenium (Ru) or their alloys.

7. The belt-shaped metal nanostructure according to claim 1 wherein the metal nanobelt is substantially free of a metal oxide.

8. A method for preparing the belt-shaped metal nanostructure according to claim 1 which comprises
   a step of forming a metal nanobelt by reacting a conductive polymer with a salt of the first metal; and
   a step of reacting the metal nanobelt with a salt of the second metal.

9. The method for preparing the belt-shaped metal nanostructure according to claim 8 wherein the reaction step of the conductive polymer with the salt of the first metal is carried out for 0.1 h to 60 days under the temperature of 0 to 70° C. and the pressure of 1 to 2 atm.

10. The method for preparing the belt-shaped metal nanostructure according to claim 8 wherein the reaction step of the metal nanobelt with the salt of the second metal is carried out for 1 sec to 60 days under the temperature of 0 to 100° C. and the pressure of 1 to 2 atm.

11. The method for preparing the belt-shaped metal nanostructure according to claim 8 wherein
   the salt of the first metal is a salt of a metal selected from the group consisting of gold (Au), silver (Ag), platinum (Pt) and cupper (Cu),
   the salt of the second metal comprises salts of one or more metals selected from the group consisting of gold (Au), silver (Ag), platinum (Pt), palladium (Pd), rhodium (Rh), iridium (Ir), cobalt (Co) and ruthenium (Ru), and the first and the second metals are different from each other.

12. The method for preparing the belt-shaped metal nanostructure according to claim 8 wherein one or more steps among the reaction step of the conductive polymer with the salt of the first metal and the reaction step of the metal nanobelt with the salt of the second metal are carried out in the presence of a reducing agent.

13. The method for preparing the belt-shaped metal nanostructure according to claim 12 wherein the reducing agent is one or more selected from the group consisting of polyphenol compounds, amine compounds, pyridine compounds, aldehyde compounds and polyhydric alcohol compounds.

14. The method for preparing the belt-shaped metal nanostructure according to claim 8 wherein the reaction step of the conductive polymer with the salt of the first metal or the reaction step of the metal nanobelt with the salt of the second metal is carried in a solvent or a mixture of one or more solvents wherein the solvent is selected from the group consisting of water, alcohol, acetone, methyl ethyl ketone (MEK), ethylene glycol, formamide ($HCONH_2$), dimethylformamide (DMF), dimethylacetamide (DMAc), dimethyl sulfoxide (DMSO) and N-methylpyrrolidone (NMP).

15. A catalyst which comprises the belt-shaped metal nanostructure according to claim 1.

16. The catalyst according to claim 15 which is used as a catalyst for oxidation reaction, a catalyst for reduction reaction, a catalyst for fuel cells or a catalyst for electrochemical sensors.

* * * * *